US006414786B1

(12) United States Patent
Foursa

(10) Patent No.: US 6,414,786 B1
(45) Date of Patent: *Jul. 2, 2002

(54) METHOD AND APPARATUS FOR REDUCING POLARIZATION DEPENDENT GAIN IN RAMAN AMPLIFICATION

(75) Inventor: Dmitri Foursa, Freehold, NJ (US)

(73) Assignee: TyCom (US) Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,367

(22) Filed: Mar. 27, 2000

(51) Int. Cl.[7] .................................................. H01S 3/00
(52) U.S. Cl. ...................................... 359/334; 359/341.3
(58) Field of Search ..................... 372/6, 3, 26; 359/124, 359/127, 134, 251, 334, 337, 341, 349

(56) References Cited

U.S. PATENT DOCUMENTS

| | | | | | |
|---|---|---|---|---|---|
| 4,700,339 A | * | 10/1987 | Gordon et al. | .................. | 370/3 |
| 5,345,331 A | * | 9/1994 | Bergano et al. | ............. | 359/341 |
| 5,357,364 A | * | 10/1994 | Gordon et al. | ............. | 359/173 |
| 5,912,755 A | * | 6/1999 | Bergano et al. | ............. | 359/181 |
| 5,936,763 A | * | 8/1999 | Mitsuda et al. | ............. | 359/341 |
| 6,020,991 A | * | 2/2000 | Yoshinori et al. | ............ | 359/341 |
| 6,118,561 A | * | 9/2000 | Maki | .......................... | 359/124 |
| 6,118,563 A | * | 9/2000 | Boskovic et al. | ............ | 359/124 |
| 6,134,033 A | * | 10/2000 | Bergano et al. | ............. | 359/122 |
| 6,147,796 A | * | 11/2000 | Ma et al. | .................... | 359/341 |
| 6,191,877 B1 | * | 2/2001 | Chraplyvy et al. | ......... | 359/124 |

OTHER PUBLICATIONS

Butler et al., "Operation of a Nonlinear Optical Loop Mirror with Orthogonally Polarized Waves in Nonpolarization–Preserving, Single–Mode Fiber", IEEE Photonics Technology Letters, vol. 8, No. 6, Jun. 1996, pp. 779–781.*

Evangelides et al., "Polarization Multiplexing with Solitons", Journal of Lightwave Technology, Jan. 1992, pp. 28–35.*

Becker et al. Erbium–Doped Fiber Amplifiers Fundamentals and Technology. Academic Press. p. 297.*

* cited by examiner

Primary Examiner—Thomas H. Tarcza
Assistant Examiner—Deandra M. Hughes

(57) ABSTRACT

A method and apparatus for providing broad band Raman amplification with reduced dependence on polarization state and wavelength. Pump beams of adjacent wavelength are perpendicularly polarized to each other. Further, the wavelength spacing between adjacent pump beams is chosen for the given fiber wavelength spectrum and distance between repeater stations such that adjacent pump beams experience the same polarization state evolution as they travel through the fiber.

29 Claims, 5 Drawing Sheets

METHOD AND APPARATUS FOR REDUCING POLARIZATION DEPENDENT GAIN IN RAMAN AMPLIFICATION

FIELD OF THE INVENTION

The invention pertains to Raman amplification. More particularly, the invention pertains to broad band fiber optic communication systems utilizing Raman amplification.

BACKGROUND OF THE INVENTION

In transoceanic fiber optic communication systems, a signal may be transported via optical fiber several thousand kilometers between the transmitter and the receiver. Over such large distances, a light signal transported via fiber optic cable suffers significant degradation. Accordingly, repeater stations comprising amplifiers are placed intermittently in the optical fiber path to amplify the signal in order to compensate for the propagation degradation. Traditionally, in transoceanic transmission system, these repeater stations might be positioned approximately 50 kilometers apart and comprise electronic amplifiers. Accordingly, the light signal needed to be converted from light to electrical, then amplified, and then converted back to light for propagation via the fiber optic cable to the next repeater station or receiver.

More recently, erbium-doped fiber amplification (EDFA) has been used to replace electronic amplifiers. EDFA is a light amplification system that does not require any conversion of the light signals to electrical signals.

Even more recently, Raman amplification systems have been developed for amplifying signals in long-distance fiber optic transmission lines. Raman amplification is a well-known technique for amplifying signals in fiber optic transmission systems. Raman amplification is considered promising for trans-oceanic fiber optic communication systems such as are in use today for international telephonic and other communication applications.

Raman amplification is a well-known phenomenon which will not be described in detail herein. However, in very general terms, one or more pump beams are introduced into a fiber carrying a signal beam. The pump beam(s) should be at a certain wavelength separation from the signal beam. Raman effect is a scattering of the incident photon of the pump beam by a molecule to a lower frequency photon. At the same time, the molecule makes a transition between vibrational states. The incident light acts as a pump to generate the lower frequency light of the signal beam, which is called Stokes wave.

Unlike the aforementioned prior art amplification systems, Raman amplification is a distributed amplification system. That is, the amplification occurs throughout the entire length of the fiber and there is no particular discrete section in the data path to which amplification is limited.

One of the many advantages of Raman amplification is that it can be used in connection with many types of inexpensive, transparent media because it is based on the molecular structure of non crystalline fibers, rather than any particular doping scheme. For instance, Raman amplification can be performed in silica fibers which are relatively low cost. Another advantage of Raman amplification is that Raman amplification can be achieved over a very broad bandwidth, stretching to almost 300 nanometers.

In one common type of scheme, the pump beam(s) are launched to travel in the fiber in the opposite direction to the signal beam(s), i.e., the pump beam(s) are counter-propagating to the signal beam(s). In very long distance fiber optic cable lines, such as the aforementioned transoceanic application, pump beams may be introduced into the fiber at multiple locations between the transmitter and the receiver. However, as previously noted, while the laser sources for the pump beams and the apparatus for coupling the pump beams into the transmission fiber are discrete components, the amplification occurs throughout the entire length of the fiber.

The Raman amplification provided by any given pump beam is not uniform over a range of signal beam wavelengths. FIG. 1 is a graph showing the Raman gain curve for an exemplary pump beam. FIG. 1 shows the gain curve over a frequency span of about 300 nm. By the use of multiple, wavelength-separated, equalized, pump beams, an overall gain curve that is relatively flat over a broad band of signal wavelengths can be provided. For example, FIG. 2A illustrates the gain curves for four closely spaced pump beams centered at about 1425 nm, 1439 nm, 1453 nm and 1467 nm, respectively. These four pump beams such as illustrated in FIG. 2A combine to produce an overall amplification characteristic that is relatively flat over a broad range of wavelengths, such as illustrated in FIG. 2B.

The Raman amplification effect is polarization sensitive. Particularly, when a pump beam and a signal beam are parallelly polarized relative to each other, maximum Raman gain is obtained. On the other hand, when a pump beam and a signal beam are perpendicularly polarized relative to each other, Raman gain is close to zero. Accordingly, it is desirable when using Raman amplification to keep the pump and signal beams parallelly polarized to each other in order to achieve maximum gain. Another possibility is simply to use unpolarized pump and signal beams. This solution decreases gain from the maximum possible achievable gain, but causes all signal beams to experience approximately the same amplification.

Semiconductor lasers are well known in the art. Generally, they are less expensive, smaller, and more reliable than other laser light sources. Accordingly, it is generally desirable to use semiconductor lasers in most applications, including as pump and signal beams for Raman amplification systems. However, semiconductor lasers produce polarized light.

Further, while polarization maintaining optical fibers are known, non-polarization maintaining fibers are much more common and are substantially lower in cost. It is believe that all existing transoceanic fiber optic cables are non-polarization maintaining.

Accordingly, it is an object of the present invention to provide an improved Raman amplification method and apparatus.

It is another object of the present invention to provide a Raman amplification method and apparatus in which polarization dependent gain is minimized.

It is a further object of the present invention to provide a Raman amplification system in which signal beams of disparate wavelengths experience the same amplification.

SUMMARY OF THE INVENTION

In accordance with the present invention, a Raman amplification method and apparatus is provided in which a plurality of wavelength division multiplexed signal beams are carried on an optical fiber. A plurality of pump beams are launched into the fiber in a counter propagating direction relative to the signal beams. The pump beams are spaced in wavelength relative to each other such that each pump beam has an adjacent pump beam(s) (i.e., the next lowest frequency and/or next highest frequency pump beam) that is within a wavelength range of it such that the two adjacent beams experience the same polarization evolution as they traverse the fiber. Further, pump beams of adjacent wavelengths are perpendicularly polarized relative to each other.

In this manner, the gain experienced by all signal beams over a broad range of wavelengths is essentially the same.

DETAILED DESCRIPTION OF THE INVENTION

Figure 1:
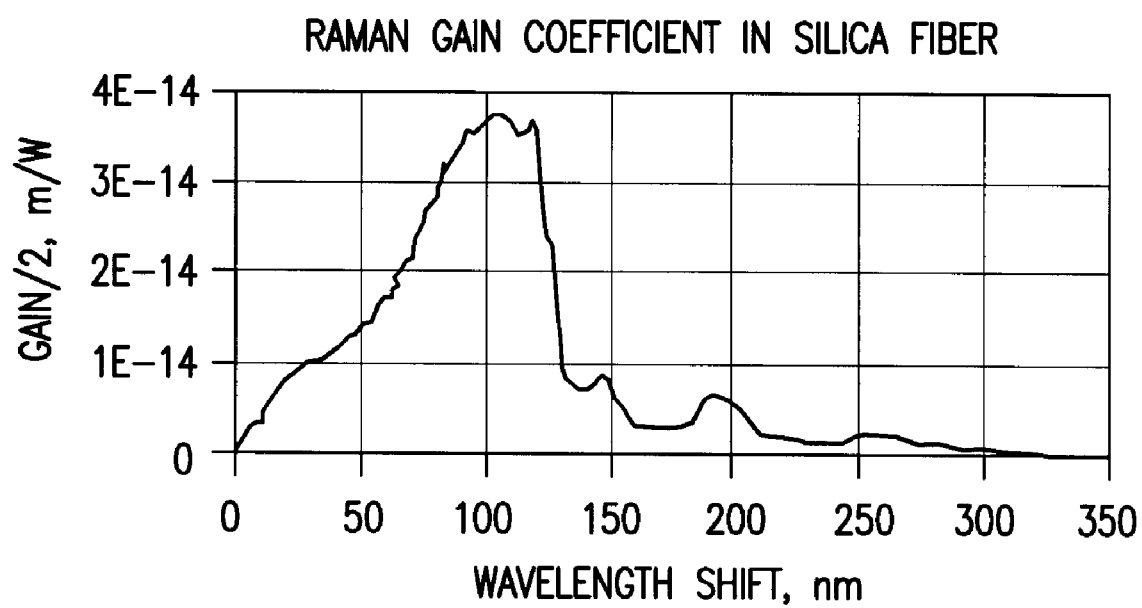
FIG. 1 is a graphical diagram illustrating a Raman amplification curve.
Figure 2A:
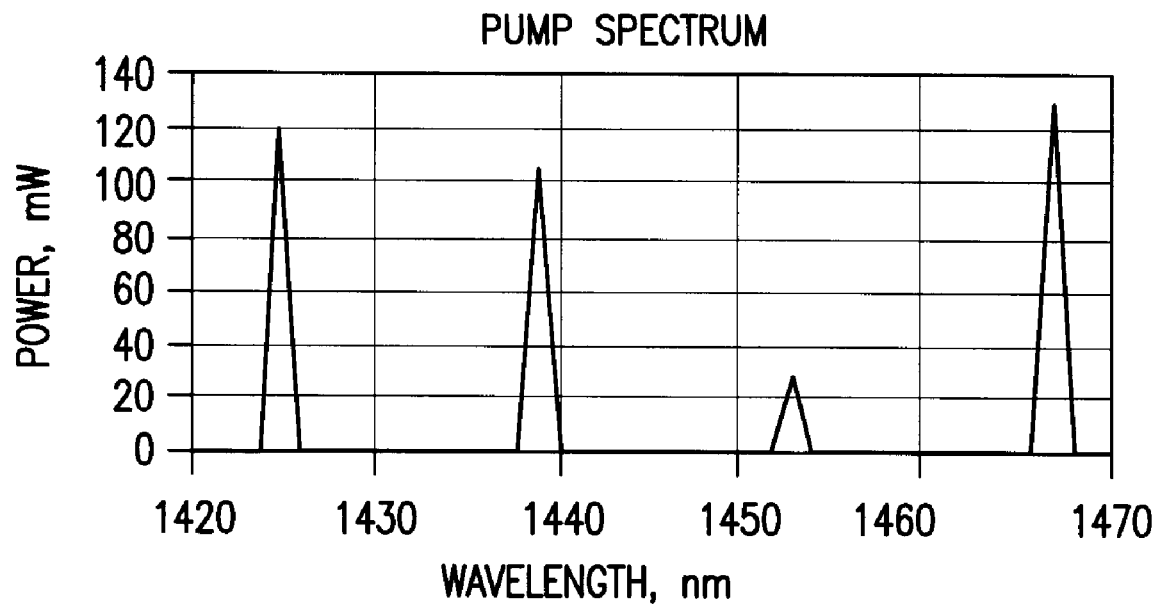
FIG. 2A is a graphical diagram illustrating a plurality of Raman amplification curves produced by each of a plurality of pump beams wavelength displaced from each other.
Figure 2B:
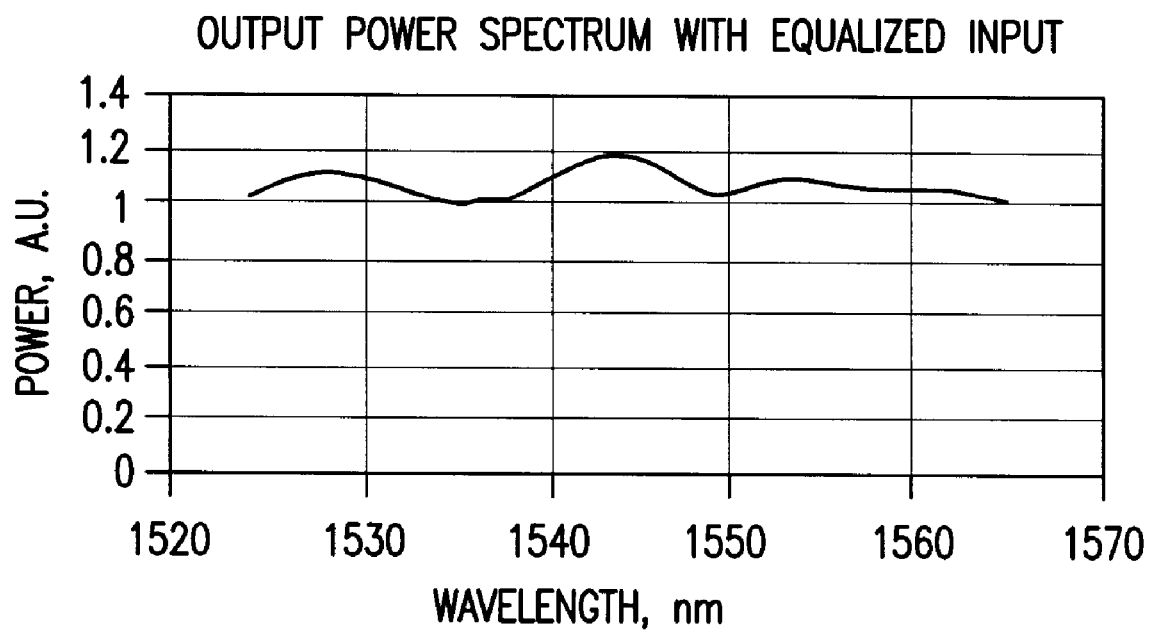
FIG. 2B is a graphical diagram illustrating the overall Raman amplification curve produced as a result of the plurality of pump beams illustrated in FIG. 2A.

It is always desirable to maximize the amount of information that can be carried over any type of medium. However, it is particularly desirable with respect to transoceanic optical fiber cables due to the extremely high cost of laying such cables and associated equipment under the ocean. Accordingly, Wavelength Division Multiplexing (WDM) and particularly Dense Wavelength Division Multiplexing (DWDM) fiber optic transmission systems have been developed for transoceanic and other long-distance transmission systems. In WDM and DWDM, multiple signals carried within different wavelength light are transmitted simultaneously on a single optical fiber. Accordingly, Raman amplification is particularly desirable for WDM and DWDM fiber optic systems because it can provide amplification over such a broad range of wavelengths.

In non-polarization maintaining optical fibers, the polarization state of light traversing the fiber evolves over the distance traveled. However, polarized light remains polarized as it propagates through the fiber. The evolution of the polarization state of a light beam as it travels through a non-polarization maintaining fiber is dependent on a complex relationship between a very large number of factors and, for purposes of this discussion, can generally be considered unpredictable. One of the factors upon which polarization state evolution is dependent is the wavelength of the light. Specifically, while the polarization evolution of a light beam of a particular wavelength in a non-polarization maintaining fiber is essentially unpredictable, it is known that two light beams having the same wavelength and that simultaneously travel through a given optical fiber segment will experience the same polarization evolution. In fact, two beams that are very close to each other, but not identical, in wavelength will experience the same polarization evolution in a fiber. E.g., S. G. Evangelidis Jr., L. F. Mollenauer, J. P. Gordon, and N. S. Bergano, *"Polarization Multiplexing With Solitons"*, Journal of Lightwave Technology, Volume 10, Number 1, January, 1992.

The equation below can be used to determine the maximum wavelength separation of two beams in order for them to experience essentially the same polarization evolution through an optical fiber.

$$\overline{\delta f} = (2\sqrt{\langle \delta T^2 \rangle})^{-1}$$

where $\overline{\delta f}$ = the average frequency range within which two beams will experience the same polarization evolution = the average period with change of frequency;

$\delta T$ is the delay difference between two polarization states; and $$\sqrt{\langle \delta T^2 \rangle} = (0.2 \, ps/\sqrt{km})\sqrt{Z},$$

where Z = the effective length of the fiber over which there is interaction between the pump and signal beams.

As an example, if we assume light at about 1500 nm and a fiber loss factor, $\alpha_p$, of about 0.22 dB/Km, then the effective interaction length, Z, would be about 18 Km. Then $\overline{\delta f}$ if would be approximately 2.35 THz. Still assuming a beam having a wavelength of about 1500 nm, this yields a wavelength range of 18 nanometers. Thus, with the conditions set forth in this example, two beams that have wavelengths separated by less than 18 nm will experience essentially the same polarization evolution in the fiber segment.

In WDM and DWDM transmission systems, it is, of course, desirable for all signal beams to experience the same amount of amplification. However, this goal can be very difficult to achieve because Raman amplification is polarization dependent and the polarization evolution of a beam in an optical fiber is wavelength dependent. Accordingly, signal beams at disparate wavelengths can experience disparate Raman amplification.

Also, for any given pump beam/signal beam pair, the Raman gain experienced by the signal beam will be relatively consistent over time due to an averaging effect. For example, both the pump beam and the signal beam will experience essentially unpredictable polarization evolution through the fiber. Thus, at any given point in the fiber, the relative polarization of the pump beam and signal beam is different from other points in the fiber. For instance, at some points, the polarization states of the pump beam and the signal beam may be parallel to each other and at other points they may be perpendicular to each other (and every other possible relationship). However, over the total length of the fiber, the points at which a pump and signal beams were perpendicular to each other will average out with those points where they are parallel to each other as well as all other points to produce relatively consistent gain over time.

When there are multiple simultaneous pump beams and multiple simultaneous signal beams spread out over a broad spectrum of wavelengths, different wavelength pump beams will experience different polarization state evolutions. Accordingly, the whole spectrum of signal beams will be unstable in that different wavelength signal beams will experience different gains over the same fiber segment.

Figure 3:
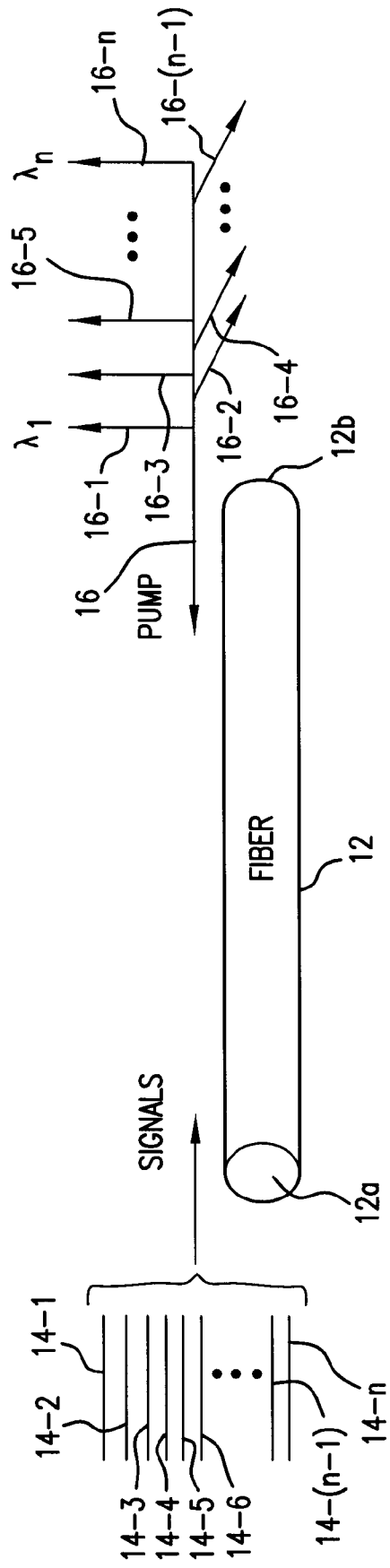
FIG. 3 is a pictorial diagram illustrating signal and pump beams in an optical fiber in accordance with the present invention.

The present invention minimizes polarization dependent gain and thus wavelength dependent gain in a Raman amplification system. FIG. 3 is a pictorial diagram conceptually illustrating the present invention. An optical fiber segment 12 of length Z is shown. A multiplicity of wavelength division multiplexed signal beams 14-1, 14-2, 14-3, . . . , 14-n are introduced into a first end 12a to propagate in a first direction through the fiber segment 12. A plurality of counter propagating pump beams 16-1, 16-2, 16-3, . . . , 16n are introduced into the fiber section at the opposite end 12b. The pump beams 16-1, 16-2, 16-3 . . . , 16-n are arranged in order of decreasing wavelength (i.e., increasing frequency). In accordance with the invention, the adjacent pump beams have wavelengths that are within a range of each other, as calculated in accordance with equations (1) and (2) above, such that they experience the same polarization evolution as they travel through the fiber. In a preferred embodiment, the wavelength spread between adjacent wavelength pump beams is no greater than 65% of the value calculated by equations (1) and (2). In a more preferred embodiment, the wavelength spacing may be about 50% of that given by equations 1 and 2.

The signal beams, 14-1 through 14-n, experience Raman amplification in the fiber section 12 due to the presence of the pump beams, 16-1 through 16-n. The amplification is over a broad range of wavelengths and is relatively flat over that entire range of wavelengths due to the multiplicity of wavelength-spaced, counter propagating, pump beams. All of the pump beams, 16-1 through 16-n, are polarized. The odd numbered pump beams, 16-1, 16-3, 16-5, . . . , 16-(n−1), are vertically polarized. The even numbered pump beams, 16-2, 16-4, 16-6, . . . , 16-n, are horizontally polarized. Accordingly, every pump beam is polarized perpendicularly to its adjacent pump beam(s). For example, pump beam 16-3 is perpendicularly polarized to the adjacent lower frequency pump beam 16-2 and is also perpendicularly polarized to the adjacent next higher frequency pump beam 16-4.

With these two conditions, namely, (1) that adjacent wavelength pump beams are perpendicularly polarized relative to each other and (2) adjacent wavelength pump beams are within the above-noted range of each other, dependence of Raman amplification gain on wavelength and polarization is minimized. Specifically, each signal beam will primarily experience gain due to the two pump beams that are closest to it in wavelength. Since these two pump beams are perpendicularly polarized to each other, the signal beam will experience the same gain throughout the length of the fiber segment. That is, at any given point in the fiber segment, the signal beam may be closer to parallel to one of the two pump beams (so as to experience more gain from that pump beam) and, thus closer to perpendicular to the other pump beam (so as to experience less gain from that pump beam). At other points in the fiber segment, the polarization of the signal beam will have different relationships to these two pump beams. However, since these two pump beams experience the same polarization evolution in the fiber, they are always perpendicular to each other. Thus, the sum of the relative polarization displacement of the signal beam from each of these two pump beams will always be the same. Accordingly, the cumulative gain experienced by the signal due to both pump beams is the same over the entire fiber span. The above-described effect applies to all signal beams relative to all pump beams.

Those of skill in the art of fiber optic communication systems will realize that there are many ways to introduce a plurality of perpendicularly polarized, wavelength-spaced, pump beams into a fiber. Three such ways are disclosed in FIGS. 4, 5 and 6.

Figure 4:
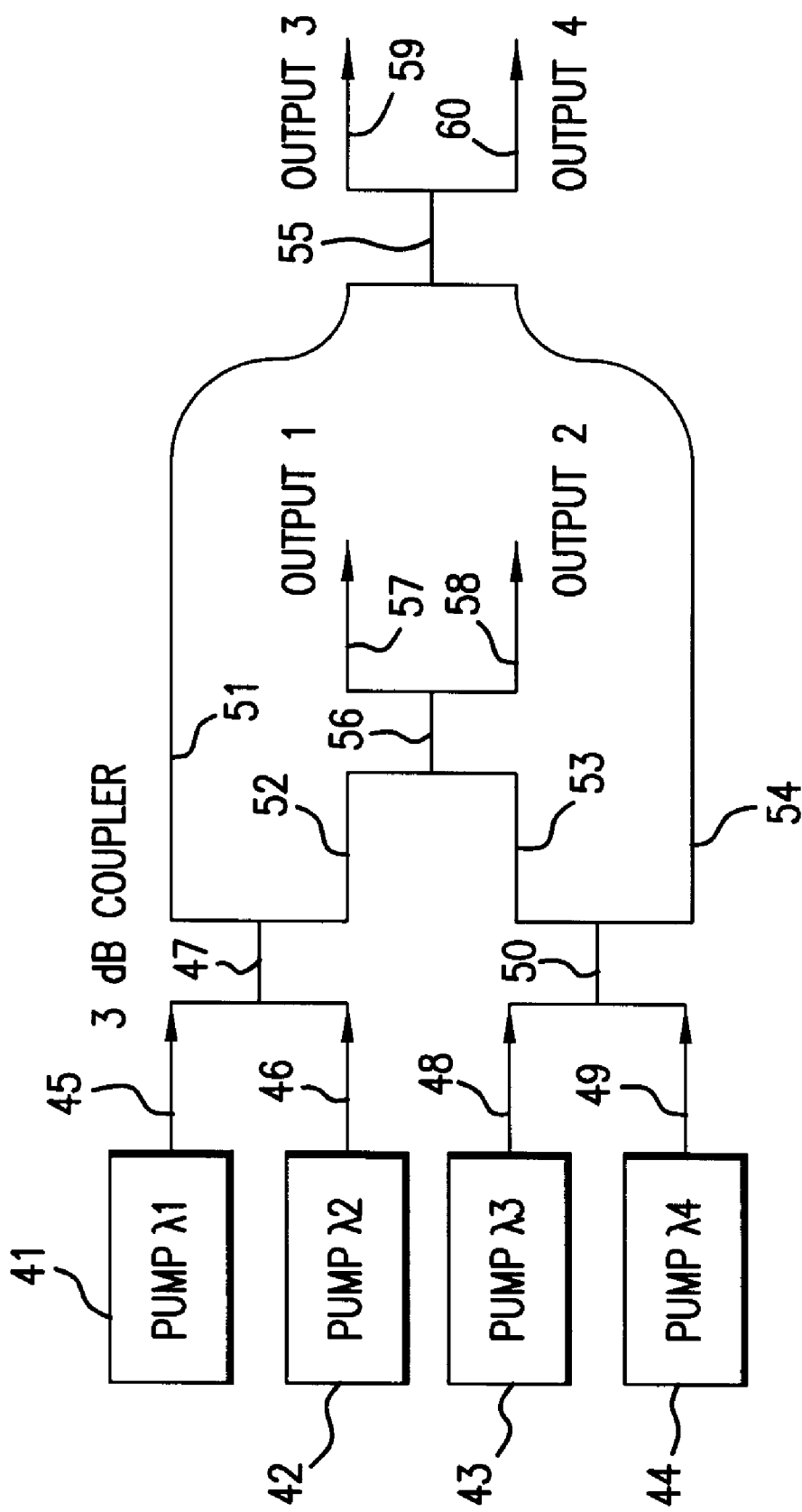
FIG. 4 is a block diagram illustrating an apparatus for producing a pump beam in accordance with a first embodiment of the present invention.

FIG. 4, for instance, illustrates a convenient manner of coupling N individual pump beams into N transmission fibers, where N is an integer. Laser light sources 41, 42, 43 and 44 are, for instance, semiconductor laser diodes generating polarized light. Laser diode 41 generates light which is vertically polarized and at a particular wavelength. Laser diode 42 generates light that is horizontally polarized and at a next longer wavelength within the range discussed above. Laser diode 43 generates light that is vertically polarized and at a next longer wavelength than the wavelength of laser diode 42. Laser diode 44 generates light that is horizontally polarized and at a next longer wavelength than that of laser diode 43, The output beams 45 and 46 of diodes 41 and 42, respectively, are input to a 3 dB polarization maintaining coupler 47. Likewise, output beams 48 and 49 of laser diodes 43 and 44, respectively, are input to a second 3dB polarization maintaining coupler 50. In accordance with the well known operation of 3dB polarization maintaining couplers, each coupler 47 and 50 has two outputs each of which comprises half the power (minus losses) of each of the input beams. Accordingly, output beam 51 combines half the power of beam 45 of diode 41 and half the power of beam 46 of diode 42. The same is true for output 52. Likewise, output 53 comprises half the power of beam 48 of diode 43 and half the power of beam 49 of diode 44. The same is true for output 54. The particular wavelengths that might be used would depend on the amplifier design, the particular transmission fiber, saturation, input power and several other factors that are well known to those of skill in the art of Raman amplifier design.

Output 51 and 54 are combined again in another 3dB polarization maintaining coupler 55 while outputs 52 and 53 are combined by an even further 3dB polarization maintaining coupler 56. Accordingly, four output beams 57, 58, 59 and 60 are produced each of which contains ¼ of the power of each of the four pump beams 45, 46, 48 and 49. Each output signal 57, 58, 59 and 60 can be coupled to a different transmission fiber (Raman amplifier).

Figure 5:
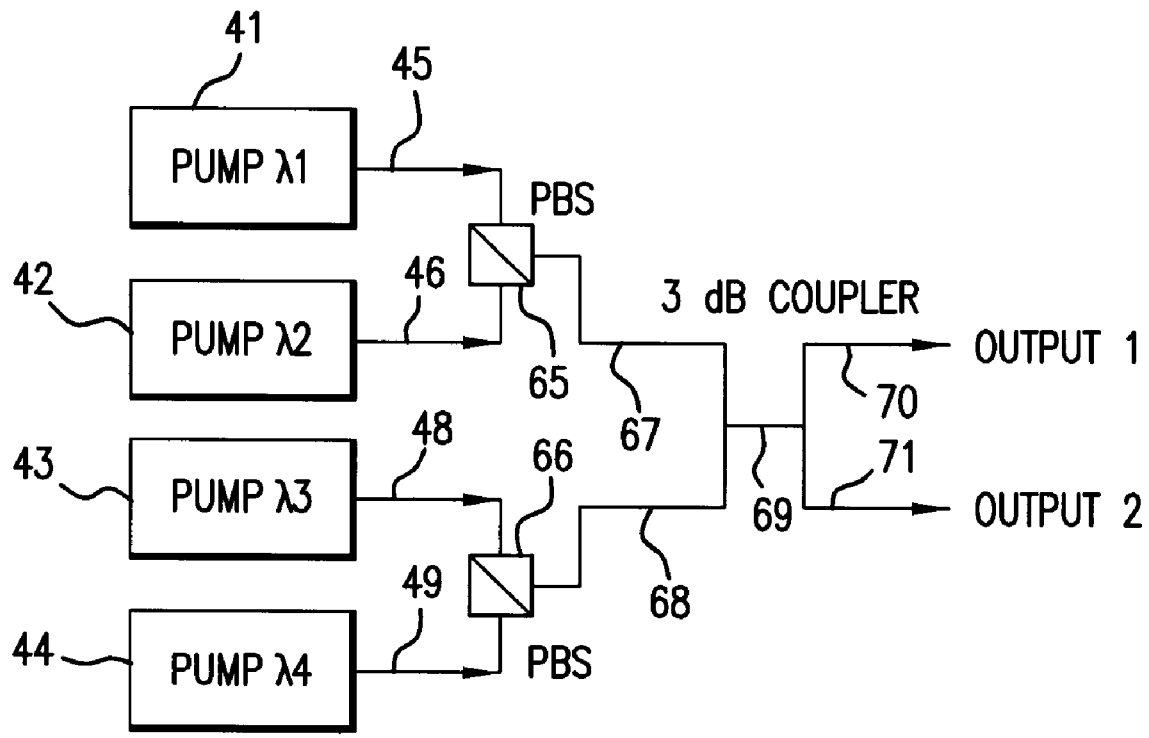
FIG. 5 is a block illustrating an apparatus for producing a pump beam in accordance with a second embodiment of the present invention.

As another example, when the number of pump wavelengths is greater than the number of transmission fibers, a system such as shown in FIG. 5 can be employed. The particular system shown in FIG. 5 produces N/2 output beams for coupling to N/2 transmission fibers, where N is the number of pump beam sources. The four pump beam sources 41, 42, 43, 44 are the same as described above in connection with FIG. 4. The output of laser diodes 41 and 42 are combined in a polarization beam coupler 65. The output of polarization beam coupler 65 has the total combined power of pump beams 45 and 46 (minus losses) and thus comprises light of two adjacent wavelengths. Beams 48 and 49 from diodes 43 and 44 are combined in the same manner by a second polarization beam coupler 66. The output of polarization beam coupler 66 comprises the combined power and wavelengths of pump beams 48 and 49 (minus losses). Outputs 67 and 68 of polarization maintaining beam couplers 65 and 66 are combined in a 3dB polarization maintaining coupler 69. Accordingly, outputs 70 and 71 of the coupler 69 each comprise half the total power of its two input beams 67 and 68. Thus, each output 70, 71 includes ½ of the total power of each of the input beams 45, 46, 48 and 49. Accordingly, each output beam 70 and 71 includes all four of the wavelengths of the four laser diodes 41, 42, 43 and 44. Outputs 70 and 71 can be coupled to two transmission fibers (Raman amplifiers).

Figure 6:
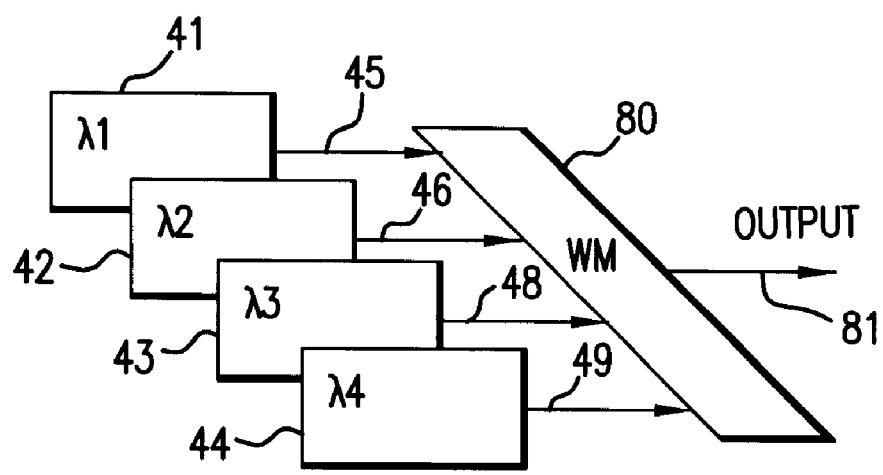
FIG. 6 is a block diagram illustrating an apparatus for producing a pump beam in accordance with a third embodiment of the present invention.

FIG. 6 shows an embodiment for producing one output from N input pump beams. In this embodiment, all four pump beams 45, 46, 48 and 49 are inputs to a polarization maintaining wavelength multiplexer 80 which produces a single output 81 combining all four beams. High density, reliable, reasonable cost, polarization maintaining, wavelength multiplexers are presently in the developmental stage.

However, it is expected that they will be available in the market within a short time.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. An apparatus for amplifying a plurality of optical channels, each at a respective wavelength, in an optical fiber by Raman amplification comprising:

a plurality of pump light sources, each of said light sources producing a pump signal of a different wavelength in consecutive order to amplify light signals propagating in said fiber, said pump signal wavelengths selected such that each pump signal is within a wavelength range of its consecutively adjacent pump signal wherein each of said pump signals experience the same polarization evolution in an optical fiber as its adjacent pump signal and wherein each pump signal is perpendicularly polarized relative to its adjacent pump signal; and a gain spectrum, associated with each of said pump signals, including a gain ripple wherein the combination of said plurality of pump signals produces a total cumulative gain spectrum with a reduced gain ripple as compared with each of said gain spectra associated with each of said pump signals.

2. The apparatus of claim 1 wherein each of said plurality of light sources comprises a laser.

3. The apparatus of claim 2 wherein each of said plurality of light sources comprises a semiconductor laser diode.

4. The apparatus of claim 3 wherein said consecutively adjacent beams are within a wavelength range of each other less than:

$$\overline{\delta f} = (2\sqrt{\langle \delta T^2 \rangle})^{-1}$$

$$\sqrt{\langle \delta T^2 \rangle} = (0.2 ps/\sqrt{km})\sqrt{Z},$$

and

Z = a length of said fiber.

5. The apparatus of claim 4 wherein each of said pump signals is within a wavelength range of its adjacent signal that is within 65% of $\delta f$.

6. The apparatus of claimed 4 wherein each of said pump signals is within a wavelength range of its adjacent pump signal that is within 50% of $\delta f$.

7. The apparatus of claim 3 further comprising coupling means for coupling said plurality of pump signals into said optical fiber.

8. The apparatus of claim 7 wherein said coupling means comprises at least one polarization maintaining coupler.

9. The apparatus of claim 7 wherein said coupling means comprises at least one polarization beam splitter.

10. A fiber optic transmission system comprising:

an optical transmitter;

an optical receiver;

optical transmission fiber disposed between said transmitter and receiver;

at least one amplifying apparatus disposed along said transmission fiber, said amplifying apparatus further comprising a plurality of pump light sources, each of said light sources producing a pump signal of a different wavelength in consecutive order to amplify light signals propagating in said fiber, said pump signal wavelengths selected such that each pump signal is within a wavelength range of its consecutively adjacent pump signal wherein each of said pump signals experience the same polarization evolution in an optical fiber as its adjacent pump signal and wherein each pump signal is perpendicularly polarized relative to its adjacent pump signal, and a gain spectrum, associated with each of said pump signals, including a gain ripple wherein the combination of said plurality of pump signals produces a total cumulative gain spectrum with a reduced gain ripple as compared with each of said gain spectra associated with each of said pump signals; and a coupler for coupling said plurality of pump signals into said optical transmission fiber.

11. The fiber optic transmission system of claim 10 wherein said fiber optic transmissions system comprises said fiber, said fiber being non-polarization maintaining.

12. The fiber optic transmission system of claim 11, wherein said coupling means is coupled to said fiber so as to introduce said pump signals into said fiber so as to propagate in a direction opposite to a direction of said signal.

13. The fiber optic transmission system comprising the apparatus of claim 11 wherein each of said adjacent beams are within a wavelength range of each other given by:

$$\overline{\delta f} = (2\sqrt{\langle \delta T^2 \rangle})^{-1}$$

where $$\sqrt{\langle \delta T^2 \rangle} = (0.2 ps/\sqrt{km})\sqrt{Z},$$

and

Z = a length of said fiber.

14. The fiber optic transmission system of claim 13 wherein each of said adjacent beams are within a wavelength range of its consecutively adjacent beams that is within 65% of $\delta f$.

15. A transoceanic communication system comprising the transmission system of claim 12.

16. A method for amplifying a plurality of signal beams in an optical fiber by Raman amplification, said method comprising the steps of:

generating a pump beam comprising a plurality of wavelengths in consecutive order, said wavelengths selected so that each wavelength is within a wavelength range of its consecutively adjacent wavelength or wavelengths such that it would experience the same polarization evolution in an optical fiber as said adjacent wavelengths and wherein light of each wavelength is perpendicularly polarized relative to light of the adjacent wavelength or wavelengths;

providing a gain spectrum, associated with each of said pump signals, including a gain ripple wherein the combination of said plurality of pump signals produces a total cumulative gain spectrum with a reduced gain ripple as compared with each of said gain spectra associated with each of said pump signals; and introducing said pump beam into said optical fiber.

17. The method of claim 16 wherein said generating step comprises separately generating a beam corresponding to each of said wavelengths and combining said beams to form said pump beam.

18. The method of claim 16 wherein said generating step comprises generating said pump beam with a plurality of semiconductor laser diodes.

19. The method of claim 18 wherein each of said wavelengths is equidistantly spaced from its adjacent wavelength or wavelengths.

20. The method of claim 18 wherein said adjacent wavelengths are within a range of each other given by:

$$\overline{\delta f} = (2^{\sqrt{<\delta T^2>}})^-$$

where $$\sqrt{<\delta T^2>} = (0.2 ps/\sqrt{km})\sqrt{\sqrt{Z}},$$

and

Z=a length of said fiber.

21. The method of claim 20 wherein each of said wavelengths is within a range of its adjacent wavelength or wavelengths that is less than or equal to 65% of δf.

22. The method of claim 20 wherein each of said wavelengths is within a range of its adjacent wavelength or wavelengths that is less than or equal to 50% of δf.

23. The method of claim 20 wherein said introducing step comprises introducing said pump beam to propagate in said fiber in a direction opposite to a direction of said signal beams.

24. A method of transmitting a plurality of wavelength multiplexed signals over an optical fiber and amplifying said signals by Raman amplification, said method comprising the steps of:

introducing a signal beam into a first end of an optical fiber segment, said beam comprising a plurality of wavelength multiplexed signals;

generating a pump beam comprising a plurality of wavelengths in consecutive order, said wavelengths selected such that each wavelength is within a wavelength range of its consecutively adjacent wavelength or wavelengths such that each pump wavelength would experience the same polarization evolution in said optical fiber as said consecutively adjacent wavelength or wavelengths and wherein light of each wavelength is perpendicularly polarized relative to light of the adjacent wavelength or wavelengths;

providing a gain spectrum, associated with each of said pump signals, including a gain ripple wherein the combination of said plurality of pump signals produces a total cumulative gain spectrum with a reduced gain ripple as compared with each of said gain spectra associated with each of said pump signals; and introducing said pump beam into said fiber.

25. The method of claim 24 wherein said generating step comprises separately generating a beam corresponding to each of said wavelengths and combining said beams to form said pump beam.

26. The method of claim 24 wherein said generating step comprises generating said pump beam with a plurality of semiconductor laser diodes.

27. The method of claim 25 wherein said adjacent wavelengths are within a range of each other given by:

$$\overline{\delta f} = (2^{\sqrt{<\delta T^2>}})^-$$

where $$\sqrt{<\delta T^2>} = (0.2 ps/\sqrt{km})\sqrt{\sqrt{Z}},$$

and

Z=a length of said fiber.

28. The method of claim 27 wherein said introducing step comprises introducing said pump beam to propagate in said fiber in a direction opposite to a direction of said signal beams.

29. The method of claim 28 wherein said fiber is non-polarization maintaining.

* * * * *

UNITED STATES PATENT AND TRADEMARK OFFICE
CERTIFICATE OF CORRECTION

PATENT NO. : 6,414,786 B1
DATED : July 2, 2002
INVENTOR(S) : Dmitri Foursa and Alexei Pilipetskii It is certified that error appears in the above-identified patent and that said Letters Patent is hereby corrected as shown below:

<u>Column 4,</u>
Line 10, replace the equation with the following:

-- $\overline{\delta f} = \left(2\sqrt{\langle \delta T^2 \rangle}\right)^{-1}$ -- ; and Line 19, replace the equation with the following:

-- $\sqrt{\langle \delta T^2 \rangle} = \left(0.2 ps / \sqrt{km}\right)\sqrt{Z}$ --

<u>Column 7, lines 40-44, Column 8, lines 30-34, Column 9, lines 10-14,
Column 10, lines 24-28,</u>
replace the equation with the following:

-- $\overline{\delta f} = \left(2\sqrt{\langle \delta T^2 \rangle}\right)^{-1}$ -- and -- $\sqrt{\langle \delta T^2 \rangle} = \left(0.2 ps / \sqrt{km}\right)\sqrt{Z}$ -- .

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,414,786 B1
DATED : July 2, 2002
INVENTOR(S) : Dmitri Foursa et al.

It is certified that error appears in the above-identified patent and that said Letters Patent is hereby corrected as shown below:

<u>Title page,</u>
Item [12], insert -- , et al. -- after "Foursa"; and
Item [75], Inventors, insert -- Alexei Pilipetskii, Colts Neck, NJ --.

Signed and Sealed this

Second Day of May, 2006

JON W. DUDAS
*Director of the United States Patent and Trademark Office*